E. G. Alwood.

Hoop Skirt.

No 784

Reissued Jul. 26, 1859.

UNITED STATES PATENT OFFICE.

E. G. ATWOOD, OF DERBY, ASSIGNOR TO THE SHELTON AND OSBORN SKIRT MANUFACTURING COMPANY, OF BIRMINGHAM, CONNECTICUT.

IMPROVEMENT IN SKELETON SKIRTS.

Specification forming part of Letters Patent No. 21,806, dated October 19, 1858; Reissue No. 784, dated July 26, 1859.

DIVISION A.

*To all whom it may concern:*

Be it known that I, E. G. ATWOOD, of Derby, in the county of New Haven and State of Connecticut, have invented certain new and useful Improvements in Skeleton Skirts, of which the following is a full, clear, and exact description, reference being had to the accompanying drawings, forming part of this specification, in which—

Figure 1:
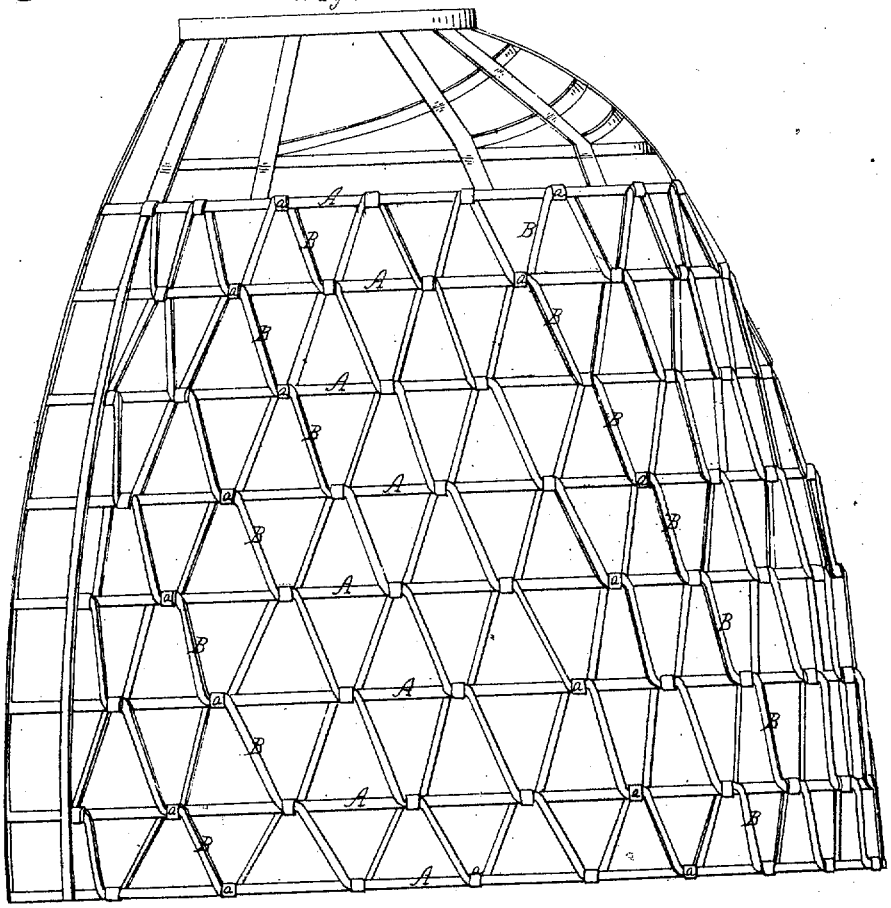
Figure 2:
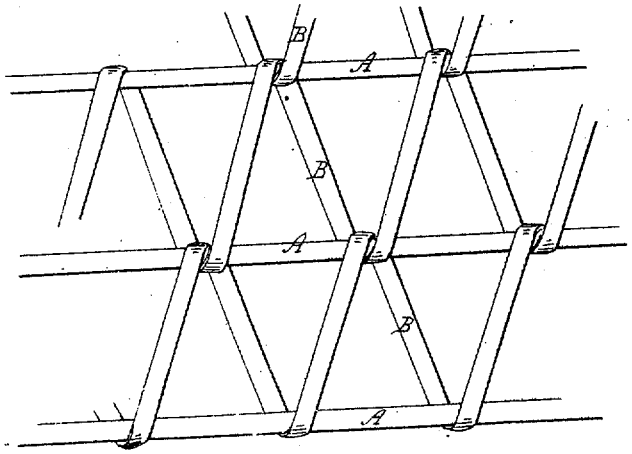

Figure 1 represents a side view of a skirt constructed according to my improvements. Fig. 2 represents a view of a portion of the skirt, on an enlarged scale, showing the manner of connecting and suspending the hoops.

The object of my improvements in hoop-skirts is to connect the hoops, by means of tapes or equivalent material, in such manner that they will be uniformly and regularly braced and tied in opposite directions, in order to avoid swinging or lateral vibration, and supported in such manner that they will be less liable to sag, to displacement, or to acquire a permanent distortion. To accomplish this object many different modes of connecting the hoops to form the skirt have been devised, and among others the application of a foundation of knit or net material, through the meshes of which, at convenient distances apart, the hoops are interlaced and rest loosely in the mesh at the interlocking of the threads and without being confined by the interlooping of the meshes. The threads or cords forming the meshes run in an oblique direction to the hoops and interlock or interloop between the hoops as well as at points of passing the hoops. This description of fabric does not support the hoops regularly and uniformly throughout, as the interlooping of the threads are not at regular and uniform distances apart or parallel to each other or to the hoops; hence the hoops, instead of being sustained at all their points of intersection with the threads, rest only on the short loops. Thus the short loops bear all the weight of the hoops, and the strain thrown upon them causes them to break or wear through rapidly; or, if they are sufficiently strong to sustain the hoops and the weight they bear, the hoops become permanently distorted, and the symmetry of the skirt is destroyed. In this diagonal arrangement of the threads or cords forming the meshes the hoops are not held down and prevented from rising by the interlocking of the meshes; hence if the weight or strain on one part of the hoop is greater than it is at the opposite point, the hoop is raised at this point, though the weight on the hoops below may be sufficient to retain them in place.

My invention consists in connecting the hoops with each other by tapes or equivalent material disposed across the hoops in opposite oblique directions in such manner that the loops of the tape connecting one set of hoops interlock with the loops of the tape connecting the next set on opposite sides of the same hoop, by which means the hoops retain their position in the diagonal loops without straining the clasps or ties by which they are confined; and my invention also consists in connecting each pair of hoops by means of a continuous tape passing in opposite diagonal directions between the hoops and forming a continuous series of connected loops around the skirt of uniform length, by which means the hoops are uniformly supported parallel to each other throughout their entire length.

A A are a series of elastic hoops which extend around the skirt, and are of the kind commonly used. D D are a series of elastic ribs forming the bustle. C C are straps which connect the bustle-ribs with each other and with the hoops and waistband. B B are straps or tapes which connect the hoops of the skirt. *a a* are clasps by which the tapes are confined to the hoops.

The straps connecting the hoops pass in opposite diagonal directions across the hoops and interloop with each other on opposite sides of the hoops, which prevents the hoops from rising in the loops.

As the straps connecting each pair of hoops are continuous and pass in opposite diagonal directions from one hoop to the other for their entire length, or as far as may be desired around the skirt, they form a continuous series of connected loops of uniform lengths, which render equally, so that the strain on all the loops for the entire length of the hoop, or as far as they extend, is uniform throughout. These tapes also form a continuous system of diagonal ties inclining in opposite directions, or lattice-work, extending from the upper to the lower hoop of the skirt, which tapes only interloop or connect at their crossing the several hoops.

Having thus described my improvements in skeleton skirts, what I claim therein as new, and desire to secure by Letters Patent of the United States, is—

1. A skirt formed of elastic hoops and tape, or equivalent material, when the tapes are disposed across the hoops in opposite diagonal directions and interlock on opposite sides of the hoops at the point of crossing, and are confined thereto, substantially as described.

2. Connecting the hoops by means of a series of loops formed by a continuous tape or equivalent material, passing around the skirt from one hoop to the other in opposite diagonal directions without interlooping or interlocking between the hoops, substantially as described, for the purpose set forth.

In testimony whereof I have hereunto subscribed my name.

E. G. ATWOOD.

Witnesses:

LUCIUS GILBERT,

F. L. FAULKNER.